United States Patent [19]
Bertrand

[11] 4,062,393
[45] Dec. 13, 1977

[54] PNEUMATIC TIRE
[75] Inventor: Marcel J. Bertrand, Grivegnee-Liege, Belgium
[73] Assignee: Uniroyal AG, Aachen, Germany
[21] Appl. No.: 451,669
[22] Filed: Mar. 13, 1974
[51] Int. Cl.² ............................................. B60C 9/18
[52] U.S. Cl. ................................ 152/361 R; 152/360; 152/374
[58] Field of Search ............... 152/354, 355, 357, 360, 152/361, 374, 361 R

[56] References Cited
U.S. PATENT DOCUMENTS

| 3,481,385 | 12/1969 | Depmeyer et al. | 152/361 R |
| 3,512,568 | 5/1970 | Delobelle | 152/361 R |
| 3,598,165 | 8/1971 | Hanus | 152/361 R |

FOREIGN PATENT DOCUMENTS

| 6,408,251 | 1/1965 | Netherlands | 152/361 |

*Primary Examiner*—Drayton E. Hoffman
*Attorney, Agent, or Firm*—Steven H. Bazerman

[57] ABSTRACT

A pneumatic vehicle tire including a reinforcing belt characterized by improved resistance to ply separation is disclosed. The tire includes a carcass, a tread overlying the crown region of the carcass, and a tread reinforcing belt which is interposed between the tread and the crown region of the carcass in circumferentially surrounding relation to the latter, the belt including a plurality of plies of belt cords. Two axially spaced circumferentially extending bodies of rubber having a Shore A hardness of between about 70 and about 80 are positioned to cover the edges and the radially inward and outward marginal portions of the belt, thereby preventing edge ply separation. Two axially spaced circumferentially extending pads of rubber having a Shore A hardness of between about 55 and about 70 are positioned radially inward of the two bodies, respectively, and radially outward of the carcass, to insure satisfactory flexibility of the tire shoulders.

16 Claims, 2 Drawing Figures

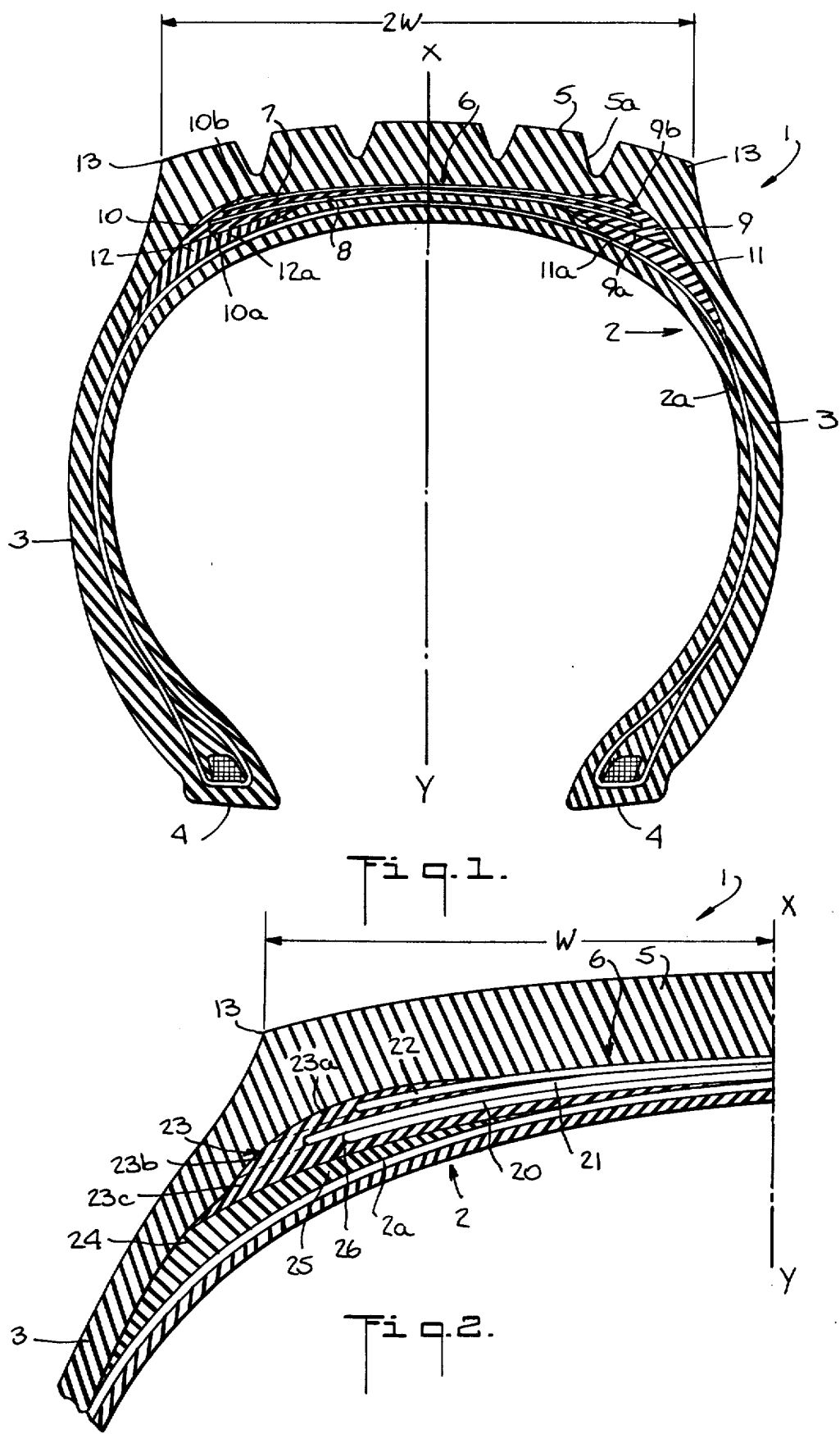

PNEUMATIC TIRE

This abstract is not to be taken either as a complete exposition or as a limitation of the present invention, the full nature and extent of the invention being discernible only by reference to and from the entire disclosure.

BACKGROUND OF THE INVENTION

This invention relates to pneumatic vehicle tires and, more particularly to pneumatic vehicle tires having reinforcing belts in the crown areas thereof.

Pneumatic tires of the "radial ply" and "bias ply" types well known in the art are frequently constructed with a reinforcing belt, commonly referred to as a breaker, interposed between the crown region of the tire carcass and the tire tread for reinforcing the latter. The breaker or belt generally comprises one or more layers or plies of tire cords or cables which are generally inextensible, i.e., made of such materials as metallic wires, glass fiber and textiles such as rayon, nylon, etc. In a mono-ply belt the cords or cables have a relatively low bias angle of 0°, i.e., they are oriented substantially parallel to the planes of the beads and to the median equatorial plane or crown centerline of the tire. If the belt is of a multi-ply construction, similar but opposed bias orientation of the cords or cables with respect to the median equatorial plane of the tire are employed in successive plies.

It is known that tires of the type mentioned above, i.e., tires having a tread reinforced by a belt or breaker composed of superposed, mutually crossed, rubberized plies of parallel, essentially inextensible cords or cables, frequently fail because separations occur in the shoulder zones of the tires where the edges of the belt plies are severely flexed as the tire tread moves into and out of contact with the road during each revolution and becomes detached from the surrounding rubber. The centrifugal forces acting on the tire and the heat build-up in the tire also contribute significantly to this problem. Such separations are made even more likely by the fact that the cords or cables in the belt plies, being disposed obliquely to the median equatorial plane of the tire by virtue of the plies being cut obliquely with respect to the longitudinal direction of the cords or cables therein, have a natural tendency to spread apart or open in a fan-wise direction at their cut ends. The edges of the belt thus constitute zones or regions where the cut and free ends of the reinforcing elements, i.e., the cords or cables, by friction and by cutting, cause breaks both at their juncture with the carcass plies and the tread rubber of the tire.

One solution which has been proposed to overcome this problem entails the use of a rigid layer of transversely oriented cables positioned radially inward of the breaker layer and a layer of rubber having a Shore A hardness of between 50 and 65 positioned radially inward of the rigid layer. This structure is illustrated in U.S. Pat. No. 3,512,568, issued May 19, 1970 to Kleber-Colombes, a French corporation.

Another solution proposed for overcoming the problem of belt ply edge separation entails the use of reinforcement layers of rubberized, radially oriented, parallel cord material positioned radially outward of the belt edges in the shoulder region of the tire and a layer of rubber having a shore A hardness of 80 disposed about the radially inward and outward marginal portions and the edges of the belt. This structure is illustrated in U.S. Pat. No. 3,598,165 issued Aug. 10, 1971 to the Dunlop Company of England.

It has been found, however, that neither of the above-described structures provide a completely satisfactory solution to the problem of belt ply edge separation. It has been found, in fact, that these structures, to some extent, caused the shoulders of the tires in which they are utilized to become so stiff that driving comfort is reduced.

SUMMARY OF THE INVENTION

It is therefore an important subject of the present invention to provide an improved support for the tread reinforcing belt utilized in pneumatic tires by means of which the aforesaid drawbacks and disadvantages may be most efficaciously avoided.

It is a further object of this invention to provide a belted pneumatic tire characterized by a high resistance to belt ply edge separation.

It is yet another object of this invention to provide a belted pneumatic tire in which the shoulders have a desired degree of flexibility.

Generally speaking, the objectives of the present invention are attained by the provision of a pneumatic tire comprising a carcass, a tread overlying the crown region of the carcass, a tread reinforcing belt interposed between the tread and the crown region of the carcass in circumferentially surrounding relation to the latter, the belt including a plurality of plies of belt cords, at least one circumferentially extending rubber body interposed between said tread and said carcass, said body covering the radially inward marginal portions and the edges of the belt, and at least one circumferentially extending rubber pad positioned radially inward of the rubber body and radially outward of the carcass, the Shore A hardness of the rubber body being different from the Shore A hardness of the tread and being greater than the Shore A hardness of the rubber pad.

BRIEF DESCRIPTION OF THE DRAWINGS

The foregoing and other objects and features of the invention will be more clearly understood from the following detailed description thereof when read in conjunction with the accompanying drawings, in which:

FIG. 1 is a cross-sectional view of a tire according to the invention, and

FIG. 2 is a cross-sectional view of a portion of a tire according to an alternative embodiment of the invention.

DESCRIPTION OF THE PREFERRED EMMBODIMENTS

Referring now to the drawings in which the same structural elements are indicated by the same numerals or letters, FIG. 1 illustrates a tire 1 comprising a carcass 2, a carcass ply 2a, a pair of sidewalls 3 terminating at their radially inwardmost ends in a pair of beads 4, a tread 5 formed with a plurality of grooves 5a surrounding the crown portion of the carcass and a reinforcing belt 6 interposed between the carcass and the tread for reinforcing the latter. The reinforcing belt 6 comprises at least two rubberized plies or sheets, here indicated at 7 and 8, which may be of equal or different axial widths. Each of the plies or sheets is composed of a plurality of parallel cords or cables which are essentially inextensible, i.e., made of such materials as metallic wires, glass fiber and textiles such as rayon or nylon. The axial width of the tread 5 is indicated as 2W and the median equatorial plane of the tire is indicated at X—Y. At least one circumferentially extending body of relatively hard rubber, two axially spaced rubber bodies 9 and 10 here being illustrated, are positioned symmetrically about the median equatorial plane X—Y. Each of the rubber bodies, 9 and 10, covers one of the radially inward and outward marginal portions, and the associated edge portion of the belt 6. At least one circumferentially extending pad of relatively soft rubber, two axially spaced rubber pads 11 and 12 here being illustrated, are positioned symmetrically about the median equatorial plane X—Y. The two rubber pads 11 and 12 are positioned radially inwardly of the two body segments, 9 and 10, respectively. Although only two rubber bodies and two rubber pads are illustrated in the Figures, a multiplicity of pads and a multiplicity of bodies could clearly be utilized in the same manner as that illustrated, and to the same effect.

The bodies 9 and 10 serve to prevent the undesirable belt ply edge separation. To accomplish this purpose the hard rubber bodies must cover the edges of the belt 6 and the radially inward marginal portions of the belt, the latter to an appreciable degree. Thus, the axial width of each of the bodies 9 and 10 is approximately 25% of the axial width of the tread 5, indicated as 2W, and the major portion of the axial width of the bodies lies directly under, and is contiguous with, the belt 6. A minor portion of each of the bodies is positioned axially outward of the belt 6 and these axially outward portions protect the edges of the belt 6. In addition, the bodies 9 and 10 also cover the radially outward marginal portions of the belt 6, thereby providing additional protection.

It has been found that the hard rubber bodies 9 and 10 will function most satisfactorily in preventing belt ply edge separation when they are formed of a composition having a Shore A hardness of between about 70 and about 80, a modulus of elasticity of between about 60 and about 80 $kg/cm^2$ and an elongation of 150%. It has further been found advantageous to make the radial thickness of that part of each of the bodies which covers the radially inward portions of the belt, in the region of the belt edges, generally equal to the radial thickness of the radially inwardmost one of the belt plies. Thus, in FIG. 1, the radial thickness of the bodies 9 and 10, in the regions indicated at 9a and 10a, respectively, is generally equal to the radial thickness of the ply 8. In the same manner, the radial thickness of that part of each of the bodies which covers the radially outward portions of the belt 6, in the regions of the belt edges, is generally equal to the radial thickness of the radially outwardmost one of the belt plies. Thus, in FIG. 1, the radial thickness of the bodies 9 and 10, in the regions indicated at 9b and 10b, respectively is generally equal to the radial thickness of the ply 7. Since, as above-noted, the bodies 9 and 10 have a radially inward and outward thickness, in the region of the belt edges, generally equal to the radial thickness of the radially inward and outward belt plies, and since the edges of the belt 6, which is comprised of the belt plies 7 and 8, is covered by the bodies 9 and 10, the bodies 9 and 10 therefore have a radial thickness at the edges of the belt greater than the overall radial thickness of the belt. Further, FIG. 1 illustrates the fact that portions of the bodies 9 and 10 may also be positioned between the plies 7 and 8 and the radial thickness of the bodies 9 and 10, in this embodiment, is therefore greater than twice the radial thickness of the plurality of plies of belt cords comprising the belt 6.

Although, as stated above, the hard rubber bodies 9 and 10 serve to satisfactorily protect the edges of the belt 6, thereby preventing belt ply edge separation, the bodies also cause the tire, in the region of the tire shoulders, these shoulders being indicated at 13, to become stiffer and more inflexible than is desirable. To counteract the stiffening effect of the bodies 9 and 10 the aforementioned axially spaced pads 11 and 12, which are made of a relatively soft rubber composition are utilized. These pads 11 and 12 are interposed between the bodies 9 and 10, respectively, and the carcass ply 2a, and insure that the tire shoulders 13 are sufficiently flexible so that the tire may provide satisfactory service. The pads 11 and 12 illustrated in FIG. 1 each have an axial width generally equal to, or somewhat greater than, 25% of the tread width 2W. They are, however, axially offset or "staggered" with respect to the bodies 9 and 10. The pads 11 and 12 therefore each extend axially inwardly to a point axially outward of the inwardmost portion of the bodies 9 and 10 with which they are respectively associated, and the pads thus also extend axially outwardly of the axially outward most portion of the bodies 9 and 10 with which they are respectively associated. In this regard it will be noted that, in the embodiment illustrated in FIG. 1, the bodies 9 and 10 do not extend axially outwardly of the shoulders 13, although the pads 11 and 12 do extend axially outwardly of the shoulders 13.

It has been found that the soft rubber pads 11 and 12 will function most satisfactorily in providing adequate shoulder flexibility when they are formed of a composition having a Shore A hardness of between about 55 and about 70, a modulus of elasticity of between about 45 and about 70 $kg/cm^2$ and an elongation of about 300%. It has further been found advantageous to make the radial thickness of each of the pads 11 and 12, in the region of the edges of the belt 6, at least as great as the radial thickness of the radially inward part of the bodies 9 and 10 respectively, associated therewith. Thus, the radial thickness of the pads 11 and 12, in the regions indicated at 11a and 12a, respectively, is at least as great as the radial thickness of the bodies 9 and 10 in the regions indicated at 9a and 10a, respectively.

Although in the foregoing discussion two axially spaced pads, 11 and 12, and two axially spaced bodies, 9 and 10, were illustrated, and as previously noted, a multiplicity of pads and bodies could be utilized in place thereof, it should also be understood that a single body and a single pad could also be utilized. In this latter case the single body would approximate bodies 9 and 10 in the region of the edges of the belt 6 and would taper to a minimal radial thickness in the region of the median equatorial plane, X—Y. In the same manner a single pad would approximate the pads 11 and 12 in the region of the edges of the belt 6 and would taper to a minimal radial thickness in the region of the median equatorial plane, X—Y. It will be understood of course that in the instance where a single body is utilized it will have an axial width approximately equal to the axial width of the tread, 2W. In a similar manner, if a single pad is utilized it will have an axial width exceeding the axial width 2W of the tread 5.

Turning now to FIG. 2, there is illustrated an alternative embodiment of the structure illustrated in FIG. 1. FIG. 2 is a cross-sectional view of a portion of a tire and it illustrates one-half of the tread, the axial width thereof being indicated as W, one shoulder, indicated at 13, and a portion of one sidewall, indicated at 3. FIG. 2 also illustrates a belt 6 which comprises three rubberized plies indicated at 20, 21 and 22, these plies being constructed in the same manner, and of the same materials as plies 7 and 8, previously discussed. FIG. 2 also illustrates a body 23 made of relatively hard rubber composition and a pad 24 made of a relatively soft rubber composition, the body 23 and the pad 24 functioning in the same manner, and for the same purpose as the body 10 and the pad 12, respectively, previously discussed.

Turning first to the body 23, it will be noted that it is made from three strips or sections 23a, 23b and 23c, the separations between these strips being indicated by dashed lines. In this embodiment each of the plies comprising the belt 6 has a strip of hard rubber adhered to it. The strip, which has the same composition as that of the bodies 9 and 10, discussed above, has a radial thickness in the region of the edge of the ply generally equal to twice the radial thickness of the ply. The strip also covers a marginal portion of one surface of the ply with which it is associated and the radial thickness of the strip covering the aforesaid marginal portion in the region of the edge of the ply is generally equal to the radial thickness of the ply. Thus, ply 20 and strip 23c are adhered to one another and strip 23c covers the edge and the radially inward portion of the ply 20. In the same manner plies 21 and 22 are adhered to strips 23b and 23a, respectively, and these two strips cover the edges and the radially outward marginal portions of the plies with which they are associated. It will be noted that the strips are so staggered or tapered that strip 23c extends axially outward to the greatest degree while strip 23a extends axially outward to the least extent. It will be clear of course that after vulcanization of the tire the three strips 23a, 23b and 23c will form an integral unit 23 comparable to the body 10, the radial thickness of the body 23, in the region of the edge of the belt 6, being generally equal to twice the combined radial thicknesses of the plies 20, 21 and 22. The axial width of the body 23 is between about 45% and 50% of the axial width of one-half of the tread which is indicated at W, and the body 23 extends axially outward beyond the shoulder 13.

Turning now to the pad 24, it is noted that it is of the same composition as the previously discussed pads 11 and 12, and that the pad 24 performs the same function in the same manner as the pads 11 and 12. The pad 24 has an axial width of between about 45% and about 50% of the axial width of one-half the tread, indicated as W and it extends axially outward of the body 23. The radial thickness of the pad 24, in the region of the edge of the belt 6 is at least as great as the radial thickness of the radially inward part of the body 23. Thus, the radial thickness of the pad 24 in the region indicated at 25 is at least as great as the radial thickness of the radially inward part of body 23 indicated at 26.

It will be understood that the foregoing description of the preferred embodiment of the present invention is for purposes of illustration only, and that the various structural and operational features as herein disclosed are susceptible to a number of modifications and changes none of which entail any departure from the spirit and scope of the present invention as defined in the hereto appended claims.

What is claimed is:

1. A pneumatic tire comprising:
   a carcass;
   a tread overlying the crown region of the carcass;
   a tread reinforcing belt interposed between said tread and said crown region of said carcass in circumferentially surrounding relation to the latter, said belt including a plurality of plies of belt cords;
   at least one circumferentially extending rubber body interposed between said tread and said carcess, said body covering the radially inward marginal portions and the edges of said belt; and
   at least one circumferentially extending rubber pad positioned radially inward of said rubber body and radially outward of said carcass,
   the Shore A hardness of said rubber body being different from the Shore A hardness of said tread and being greater than the Shore A hardness of said rubber pad.

2. A tire as described in claim 1 wherein the Shore A hardness of said body is between about 70 and about 80 and the Shore A hardness of said pad is between about 55 and about 70.

3. A tire as described in claim 2 having at least two of said rubber bodies, each of said bodies being axially spaced from the other of said bodies and covering a corresponding radially inward marginal portion and edge of said belt.

4. A tire as described in claim 3 wherein each of said bodies covers one of the radially outward portions of said belt.

5. A tire as described in claim 3 wherein the radial thickness of that part of each of said bodies which covers the radially inward portions of said belt is, in the region of the belt edges, generally equal to the radial thickness of the radially inwardmost one of said plies of belt cords.

6. A tire as described in claim 3 wherein the radial thickness of that part of each of said bodies which covers the edges of said belt is generally equal to twice the radial thickness of said plurality of plies of belt cords.

7. A tire as described in claim 4 wherein the radial thickness of that part of each of said bodies which covers the radially outward portions of said belt is, in the region of the belt edges, generally equal to the radial thickness of the radially outwardmost one of said plies of belt cords.

8. A tire as described in claim 3 wherein said bodies are positioned symmetrically about the median equatorial plane of the tire.

9. A tire as described in claim 8 wherein the axial width of each of said bodies is between about 25% and about 50% of the axial width of said tread.

10. A tire as described in claim 8 wherein the axial width of each of said bodies is between about 45% and about 50% of the axial width of said tread.

11. A tire as described in claim 3 having at least two of said rubber pads, each of said pads being axially spaced from the other of said pads and being positioned radially inward of one of said bodies.

12. A tire as described in claim 11 wherein, in the region of said belt edges, the radial thickness of each of said pads is at least as great as the radial thickness of the radially inward part of the body associated therewith.

13. A tire as described in claim 12 wherein said pads are positioned symmetrically about the median equatorial plane of the tire.

14. A tire as described in claim 13 wherein the axial width of each of said pads is between about 25% and about 50% of the axial width of said tread.

15. A tire as described in claim 13 wherein the axial width of each of said pads is between about 45% and about 50% of the axial width of said tread.

16. A tire as described in claim 11 wherein each of said pads extends axially outward of the body associated therewith.

* * * * *

UNITED STATES PATENT AND TRADEMARK OFFICE
CERTIFICATE OF CORRECTION

PATENT NO. : 4,062,393
DATED : December 13, 1977
INVENTOR(S) : MARCEL J. BERTRAND It is certified that error appears in the above-identified patent and that said Letters Patent are hereby corrected as shown below:

Col. 6, Claim 1, Line 4, correct the spelling of "carcess" to

--carcass--;

Signed and Sealed this

Twentieth Day of March 1979

[SEAL]

Attest:

RUTH C. MASON
Attesting Officer

DONALD W. BANNER
Commissioner of Patents and Trademarks